United States Patent
Stroomer

(10) Patent No.: US 8,219,977 B1
(45) Date of Patent: Jul. 10, 2012

(54) USING A SOFTWARE REPOSITORY TO INCREASE THE SPEED OF SOFTWARE TESTING

(75) Inventor: Jeffrey D. Stroomer, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 1567 days.

(21) Appl. No.: 11/698,469

(22) Filed: Jan. 26, 2007

(51) Int. Cl.
*G06F 9/44* (2006.01)

(52) U.S. Cl. .................................. 717/124; 717/122

(58) Field of Classification Search ........................ None
See application file for complete search history.

(56) References Cited

U.S. PATENT DOCUMENTS

| | | | | |
|---|---|---|---|---|
| 5,371,883 A * | 12/1994 | Gross et al. | ................... | 714/38.1 |
| 6,182,245 B1 * | 1/2001 | Akin et al. | ................. | 714/38.14 |
| 6,385,768 B1 * | 5/2002 | Ziebell | ........................... | 717/121 |
| 6,651,186 B1 * | 11/2003 | Schwabe | .................... | 714/38.14 |
| 7,657,789 B1 * | 2/2010 | Gerber et al. | ................... | 714/25 |
| 2002/0194205 A1 * | 12/2002 | Brown et al. | .................. | 707/200 |
| 2004/0083208 A1 * | 4/2004 | Kroening et al. | ................. | 707/3 |
| 2004/0133444 A1 * | 7/2004 | Defaix et al. | ..................... | 705/1 |
| 2005/0055686 A1 * | 3/2005 | Buban et al. | .................. | 717/170 |
| 2006/0136513 A1 * | 6/2006 | Ngo et al. | ..................... | 707/203 |
| 2008/0040388 A1 * | 2/2008 | Petri et al. | .................. | 707/104.1 |

* cited by examiner

*Primary Examiner* — Lewis A Bullock, Jr.
*Assistant Examiner* — Jue Wang
(74) *Attorney, Agent, or Firm* — Kevin T. Cuenot; Lois D. Cartier

(57) ABSTRACT

A method of testing software can include maintaining a cache within at least one of a plurality of farm machines of a testing farm. Each cache can include at least one version of test ingredients. The method can also include receiving, within at least one selected farm machine, a request to perform a test involving a test version of the test ingredients and comparing the test version of the test ingredients with versions of the test ingredients stored within the cache of the selected farm machine. The method can also include selectively updating a version of the test ingredients stored within the cache of the selected farm machine according to the comparison.

10 Claims, 2 Drawing Sheets

USING A SOFTWARE REPOSITORY TO INCREASE THE SPEED OF SOFTWARE TESTING

FIELD OF THE INVENTION

This invention relates to the field of software testing and, more particularly, to using a software repository in performing such activities.

BACKGROUND

The development of modern software typically requires significant effort on the part of developers, engineers, and/or computer scientists. Throughout the development process, the software assets needed to create the software, e.g., source code files, continually evolve. It is not unusual for more than one developer to work on the same file, or set of files, concurrently. This requires that different versions of the same software assets be made available and tracked throughout the development process.

The different versions of software under development typically are managed by some sort of file management system. While some file management systems provide additional software development functions, such as compiling and other programming language specific functions, others simply manage files and are not tailored to any one type of development platform or environment.

One example of a file management system is Subversion. Subversion is a free, open-source, version control system capable of managing files and directories. In general, a file management system such as Subversion maintains a software repository which includes a tree of data similar to a directory structure. The tree also includes files used by the file management system to track changes to the tree, whether modifications to existing files, the addition of new files, the deletion of files, or changes to the directory structure itself. The file management system allows a developer to access older versions of any software assets maintained in the software repository.

The file management system can track many different versions of the tree. Subversion, for example, typically maintains a primary copy, or original version of the tree, called the trunk. From the trunk, branches can be created. Each branch begins as a copy of some part of the tree and, once created, has its own history. That is, each branch created from the tree represents an independent and parallel development effort. Different versions, called revisions, of branches can also be created. For example, a branch of the tree can be created for each of a plurality of different development teams. Those teams can create different revisions of the branch as development efforts progress.

In this sense, a file management system such as Subversion provides for a hierarchy of attributes, e.g., branches, revisions, or the like, for tracking changes to the tree over time. Each version of the software can be thought of as a snapshot of the software, or tree, at a given point in time as indicated by the branch and revision attributes. Eventually, the different versions of the software are merged together to create the final software product.

In a file management system, one way to obtain a particular branch or revision is simply to request a fresh copy. Requesting a fresh copy is a relatively straightforward process, but can be slow in cases where the branch or revision is large. An alternative to requesting a fresh copy is to "update" an existing copy. Typically, updating a copy is much faster than obtaining a fresh copy. When updating a copy, files can be added, deleted, and/or replaced as needed so that the copy is transformed into an exact replica of the requested copy. Generally, a client builds a temporary transaction tree that mirrors the state of the working copy. The software repository then compares that transaction tree with the revision tree of the requested revision. Information that informs the client as to the changes that are needed to transform the working copy into a replica of the desired revision tree is provided to the client. The time savings attained through updating, as opposed to obtaining a fresh copy, can be dramatic. For example, in cases where the copy to be updated and the desired copy are similar, e.g., where most of the files are identical, updating can be tens or possibly thousands of times faster than obtaining a fresh copy.

While under development, software is frequently tested. A testing farm formed of one or more computer systems is often used for testing the software. Each computer system of the testing farm (farm machine) can execute code for subjecting a particular version of the software to one or more tests. The use of a testing farm allows the software to be subjected to different tests concurrently, thereby significantly decreasing the total amount of time needed for testing.

Typically, the testing farm is implemented such that each farm machine can access a "share", i.e., a centralized data store made available through a network connection. This share can hold the "ingredients" needed to run each test. The ingredients for a test can include, but are not limited to, the code needed to execute the test, files used by the test, input data, and expected results for the test. In the context of circuit design, for example, files needed by the test can include software-based circuit descriptions. Input data can include input signals and/or vectors. Expected output for the test can include timing information, expected signal outputs, and the like.

Typically, farm machines obtain ingredients by simply accessing the ingredients needed for a given test directly from the share. Unfortunately, this approach does not scale well with farm size. In cases where the share is heavily loaded, adding farm machines can actually diminish, rather than increase, throughput of the testing farm. Accordingly, the number of computers in a testing farm can significantly limit the effectiveness of that testing farm. In other words, the amount of time needed to download the test ingredients can counter any efficiencies gained through use of the testing farm.

Another way of making test ingredients available to farm machines is to copy test ingredients from the share to local storage of each respective farm machine before starting a given test. Once the test ingredients are stored locally, testing can begin. Again, the share is a bottleneck. Because the volume of test ingredients can be very large, a significant amount of time is needed to create a copy of the test ingredients on each farm machine.

It would be beneficial to provide a technique for testing software using testing farms that addresses the limitations described above.

SUMMARY

The present invention relates to testing software using a software repository as a caching mechanism in coordination with a testing farm. One embodiment of the present invention includes a method of testing software that can include maintaining a cache within at least one of a plurality of farm machines of a testing farm. Each cache can include at least one version of test ingredients. The method can also include receiving, within at least one selected farm machine, a request to perform a software test involving a test version of the test ingredients and comparing the test version of the test ingredients with the versions of the test ingredients stored within the cache of the selected farm machine. The method can also include selectively updating a selected version of the test ingredients stored within the cache of the selected farm machine according to the comparison. The test version of the test ingredients can be stored within a software repository that is managed by a file management system and which can be accessed by each of the plurality of farm machines. The ingredients can be updated using an update procedure of the of the file management system.

The comparing of test versions with versions of the test ingredients stored within the cache can include determining whether a primary attribute of the test version of the test ingredients matches a primary attribute of a version of the test ingredients stored within the cache of the farm machine. The primary attribute can be selected to be a branch attribute. The comparing can also include determining that the primary attribute of the test version of the test ingredients matches the primary attribute of a selected version of the test ingredients stored within the cache of the farm machine and determining whether a secondary attribute of the test version of the test ingredients matches a secondary attribute of the selected version of the test ingredients. The secondary attribute can be selected to be a revision attribute.

When the secondary attributes do not match, selectively updating can include synchronizing the selected version of the test ingredients within the cache with the test version of the test ingredients stored within the software repository of the file management system. Such synchronizing can be accomplished, for example, using an update procedure or function of the software repository. The method can also include determining that no version of the test ingredients stored within the cache of the farm machine is closely related to the test version of the test ingredients and copying the test version of the test ingredients from the software repository to the cache of the farm machine.

Selectively updating the version of the test ingredients stored within the cache of the farm machine can include synchronizing the selected version of the test ingredients stored within the cache of the selected farm machine with the test version of the test ingredients when the selected version of the test ingredients has a branch attribute corresponding the test version of the test ingredients and a different revision attribute. When no version of the test ingredients stored within the cache of the selected farm machine has a branch attribute corresponding to the test version of the test ingredients, the entire test version of the test ingredients can be copied from the software repository to the cache of the selected farm machine. When a selected version of the test ingredients stored within the cache of the selected farm machine has a branch attribute and a revision attribute corresponding to the branch attribute and the revision attribute of the test version of the test ingredients stored within the software repository, the selected version of the test ingredients stored within the cache of the selected farm machine can be used for testing.

Another embodiment of the present invention can include a software testing system. The system can include a file management system having a software repository. The software repository can store a plurality of versions of test ingredients. The system can also include a testing farm having a plurality of farm machines, wherein each farm machine maintains a cache configured to store at least one version of the test ingredients that has been used for testing on each respective farm machine. The caches of different ones of the plurality of farm machines can be selectively updated according to a measure of relatedness between versions of the test ingredients stored within each respective cache and a test version of the test ingredients that each respective farm machine is instructed to use for software testing.

The system can be configured such that a selected farm machine can receive a request to test software using a test version of the test ingredients and compare at least a primary and secondary attribute of the test version of the test ingredients with a primary and secondary attribute of versions of the test ingredients maintained within the cache of the selected farm machine. The file management system can selectively synchronize a version of the test ingredients stored within the cache of the selected farm machine with the test version of the test ingredients according to the comparison of primary and secondary attributes.

Yet another embodiment of the present invention can include a machine readable storage medium having stored thereon a computer program having a plurality of code sections for causing a machine to perform the various steps and functions described herein.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to software testing and the efficient utilization of a testing farm with a file management system. The embodiments disclosed herein provide a technique for testing software under development using different versions of test ingredients on computer systems of a testing farm (farm machines). Each of the farm machines can be configured to include a cache for storing different versions of the test ingredients that have been used for software testing on that farm machine. When asked to perform a software test, the farm machine can determine whether the version of test ingredients needed for performing that test is located within its cache. If so, testing can begin using the cached version of the test ingredients.

If the version of the test ingredients needed for performing the software test does not exist on the farm machine, a determination can be made as to whether a version of the test ingredients stored in the cache of the farm machine is closely related to the version of the test ingredients needed for the software test. If so, the version of the test ingredients in the cache of the farm machine can be updated. If not, a copy, or clone, of the version of the test ingredients needed for software testing can be copied to the cache of the farm machine.

Figure 1:
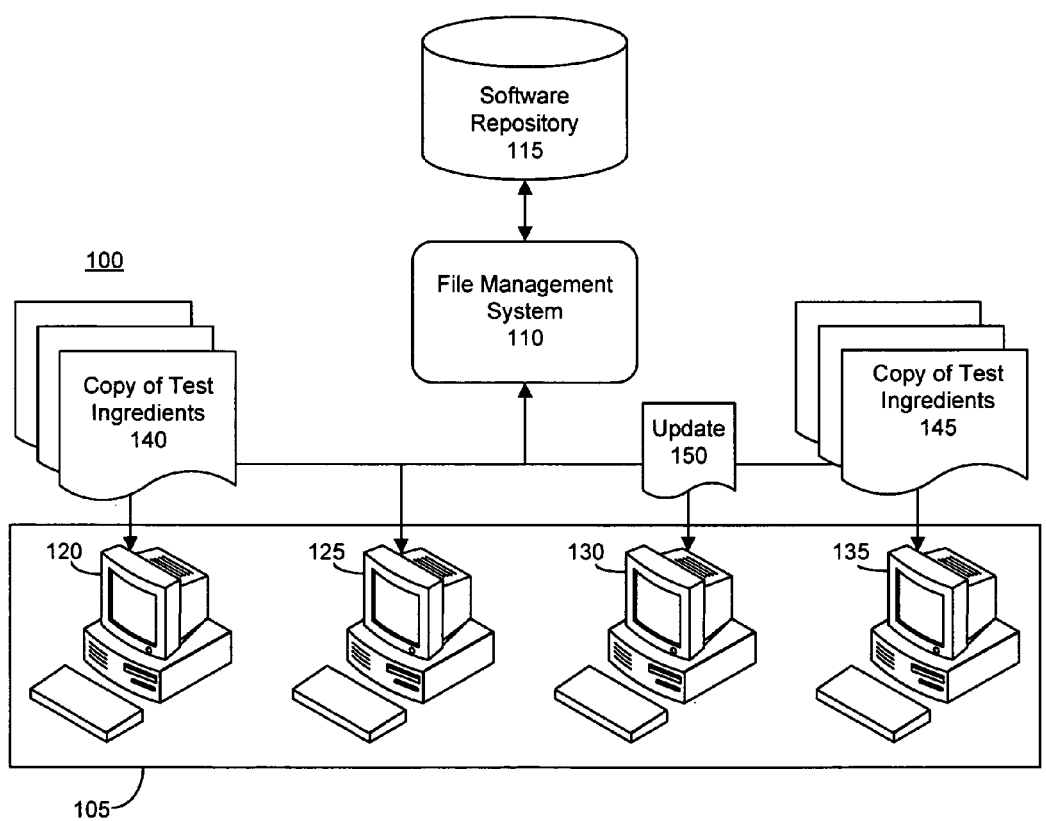
FIG. 1 is a block diagram illustrating a system configured in accordance with one embodiment of the present invention.

FIG. 1 is a block diagram illustrating a system 100 configured in accordance with one embodiment of the present invention. As shown, the system 100 can include a testing farm 105 and a file management system 110 that is communicatively linked with a software repository 115. The testing farm 105 can be implemented using a plurality of farm machines 120, 125, 130, and 135. Each of the farm machines 120-135 can be communicatively linked with the file management system 110 via a network, and thus, the software repository 115. In one embodiment, the testing farm 105 and the software repository 115 can be proximate to one another, e.g., within the same building or area. In another embodiment, the testing farm 105 and the software repository 115 can be remotely located from one another with distances of many miles separating the two.

The software repository 115 can be any sort of permanent data storage mechanism such as a high speed disk drive, a drive array, or the like. Despite its physical implementation, the software repository 115 can include multiple versions of the software under development. The software repository 115 further can include one or more sets, or versions, of test ingredients needed for testing the software under development. In general, any version of the software that is tested using one of the farm machines 120-135 as well as the different versions of test ingredients needed for performing such testing are first provided to the farm machines 120-135 by the file management system 110 from the software repository 115.

The software repository 115 can be maintained by the file management system 110. In one embodiment, the file management system 110 can be implemented as Subversion, for example. For convenience, the various embodiments disclosed herein are described largely with reference to terminology derived from the Subversion file management tool. It should be appreciated, however, that the embodiments disclosed herein are not intended to be limited by such references as any of a variety of different file management systems can be used. For example, the versioning attributes discussed with reference to Subversion are largely hierarchical, e.g., a trunk, branches, and revisions. As such, the embodiments disclosed herein can be applied to other file management systems that utilize a copy-modify-merge model and which utilize one or more hierarchical attributes to distinguish among different versions or collections of software assets.

In one embodiment, the software repository 115 can include a directory structure having various software assets; e.g., source files and any other data that may be necessary to produce a build of the software under development. In another embodiment, the software repository 115 can include a directory structure having various test ingredients, or versions of test ingredients. A test ingredient can include any software component or asset that is needed or used in performing a test on software. With respect to Electronic Design Automation (EDA) tools such as those needed to implement a programmable logic device, e.g., a field programmable gate array, a test ingredient can include a circuit description, inputs to be provided to the circuit description, expected outputs, constraint files relating to timing, power consumption, or the like, and any other software components that may be needed or referenced by the software undergoing testing.

The baseline version of the tree from which all other versions of the test ingredients evolve can be referred to as the trunk. From the trunk, one or more branches can be created. Each branch refers to a line of development that exists independently of each other branch. Still, a given pair of branches share a common history if the line of development is reviewed at a point in time prior to the creation of each respective branch. Each branch begins as a copy at the branch point and continues its existence with its own history going forward. Branches allow for concurrent and independent development efforts to be performed on a same set of software assets, whether the software under development or the test ingredients. For example, branches facilitate the creation of different versions of test ingredients needed for different testing scenarios. Beneath each branch can be zero or more revisions.

Each of the farm machines 120-135 can include client software (not shown) configured to communicate with the file management system 110 as well as one or more control consoles (not shown), or a single control console, through which commands can be issued to various ones of the farm machines 120-135. Each of the farm machines 120-135 further can be configured to include and maintain a cache of test ingredients that have been tested on that machine. The cache of each respective farm machine 120-135 can be implemented using a persistent data store such as a disk drive. Rather than purging each version of the test ingredients upon completion of a test, the version of the test ingredients can be maintained or stored within the cache of the respective farm machine. When one or more of the farm machines 120-135 is asked to perform a software test, each farm machine 120-135 can check its local cache to determine whether the version of the test ingredients specified by the test to be performed is already stored within the cache. If so, the version of the test ingredients need not be copied to the farm machine.

With reference to FIG. 1, the farm machine 125, for example, can be asked to perform a software test. After checking its local cache, the farm machine 125 can determine that the version of the test ingredients needed for the software test is already stored within its local cache. Accordingly, the farm machine 125 need not obtain any test ingredients from the file management system 110 and the software repository 115. The farm machine 125 may or may not need to obtain the software to be tested from the file management system 110 independently of the test ingredients needed to test such software.

By comparison, the farm machines 120, 130, and 135 can be asked to perform software tests. Each of the farm machines 120, 130, and 135 can also check their local caches to determine whether the test version of the test ingredients on that farm machine is already stored locally. As shown, each of the farm machines 120, 130, and 135 requires at least some data from the software repository 115. For example, farm machine 120 may not have any version of the test ingredients stored within its local cache that is considered closely related to the version of the test ingredients needed for software testing. As such, farm machine 120 may need to obtain a copy of the entire version of the test ingredients 140 needed for software testing. A similar condition may exist with respect to farm machine 135, where another copy of the entire version of the test ingredients 145 needed for software testing is downloaded to the cache of farm machine 135. The different computers may require different versions of test ingredients as the particular test of the software being performed on each farm machine 120-135 may or may not be the same.

Farm machine 130, for example, may include a version of the test ingredients from a prior test that is stored within its cache and which is considered to be closely related to the version of the test ingredients needed for software testing. In that case, rather than download a fresh copy of the version of the test ingredients needed for the software test, the version stored within the cache of farm machine 130 that is considered closely related can be updated by the file management system 110 via update 150. The update process can make any modifications to the closely related version of the test ingredients stored in the cache of farm machine 130 such that when the update process is complete, that version of the test ingredients is the same as the version of the test ingredients needed for software testing. The process effectively can synchronize the related version of the test ingredients stored in the cache with the version of the test ingredients to be tested that is stored in the software repository 115. It should be appreciated that the update process can include, but is not limited to, modifying existing files, adding files, deleting files, as well as making changes to the directory structure of the tree, or related version of the test ingredients stored within the cache of farm machine 130. It should be appreciated that updating can be accomplished using standard mechanisms that are available as part of the file management system.

With respect to Subversion, for example, when a version of the test ingredients is copied to the cache of a farm machine, a local reflection of the files and directories of the software repository 110 can be created on the farm machine. This local reflection can also be called a working copy. The working copy is, in general, the files and directory structures in existence as of the time indicated by the desired version, which is indicated by the branch and revision attributes. In any case, the working copy is essentially a directory tree stored locally on the farm machine within a designated storage location, e.g., the cache.

The determination as to whether a version of the test ingredients stored in the cache of a farm machine is closely related to a version of the test ingredients needed for a software test can be performed through a comparison of the different versioning attributes used by the file management system 110. For example, in the case, of Subversion, comparisons can be performed between branch attributes and revision attributes. In one embodiment, two different versions of the test ingredients can be considered closely related if each has a same branch attribute, but different revision attributes. Other comparisons and attribute combinations can be compared as well. As such, the example presented herein is not intended to limit the present invention in any way.

Figure 2:
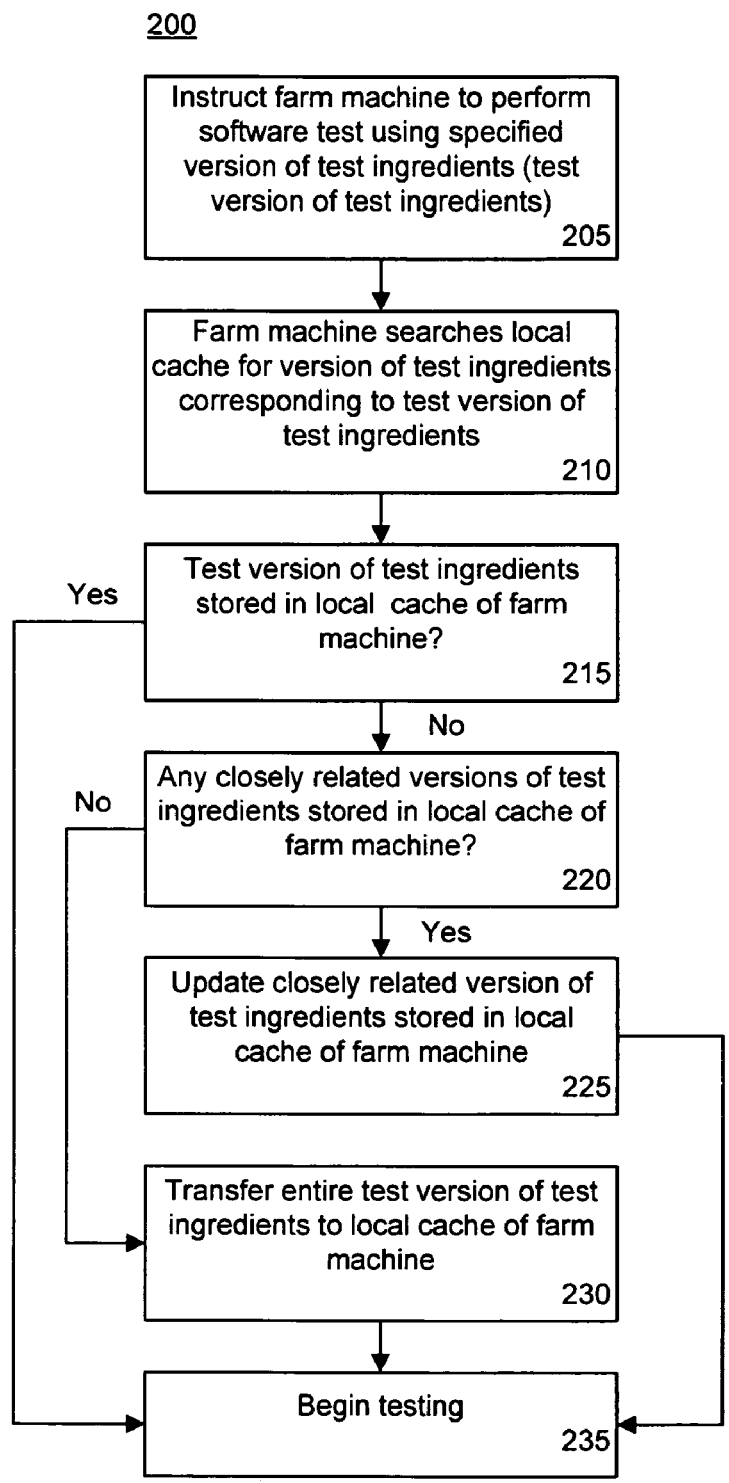
FIG. 2 is a flow chart illustrating a method of software testing in accordance with another embodiment of the present invention.

FIG. 2 is a flow chart illustrating a method 200 of software testing in accordance with another embodiment of the present invention. The method 200 can be performed using a system such as the one described with reference to FIG. 1. Accordingly, the method 200 can begin in a state where a software repository includes multiple versions of test ingredients for use in testing software that is under development. Those versions of test ingredients, for example, can be characterized by the different branch and/or revision attributes associated with each respective version within the software repository. Software testing using the testing farm can begin.

Accordingly, in step 205, a command can be provided to a farm machine within the testing farm to perform a selected software test. The selected software test can indicate a particular version of test ingredients, referred to as the test version, to be used in testing a given piece of software. While the software to be tested can be downloaded to the farm machine dynamically from the software repository, the software under test can also be pre-installed on one or more of the farm machines, or can be available on a share that is connected to all farm machines. The command, for example, can be provided from a control console or other user interface. In one embodiment, the test version of the test ingredients can be specified using branch, e.g., primary, and revision, e.g., secondary, attributes.

In step 210, the farm machine can search its local cache for a version of the test ingredients needed for the software test that has the same branch and revision attributes as the test version of the test ingredients. Having the same branch and revision attributes can indicate that each version of the test ingredients is identical. In step 215, a determination can be made as to whether the test version of the test ingredients is stored within the local cache of the farm machine. If so, the method can proceed to step 235 to begin testing using the version of the test ingredients stored in the cache of the farm machine.

If the test version of the test ingredients is not stored within the local cache of the farm machine, the method can proceed to step 220. In step 220, a determination can be made as to whether any versions of the test ingredients stored within the local cache of the farm machine are closely related to the test version of the test ingredients. If so, the method can proceed to step 225. If not, the method can continue to step 230.

In one embodiment, for example, the branch and revision attributes of the test version of the test ingredients can be compared with the branch and revision attributes of the versions of the test ingredients stored within the local cache of the farm machine. Two versions of the test ingredients can be considered closely related if each has a same branch attribute or value, but different revision attributes or values. For example, a version of test ingredients having a branch attribute of A and a revision attribute of 2 can be considered closely related to another version of the test ingredients having a branch attribute of A and a revision attribute of 1 or 3. The test ingredient version having a branch attribute of A may or may not be considered closely related to a test ingredient version having a branch attribute of B. As noted, other attributes can be compared and evaluated depending upon the particular file management system that is used. In this case, the branch and revision attributes can be considered hierarchically related in that revisions are considered subsets of branches.

In step 225, where the local cache of the farm machine has a version of the test ingredients that is closely related to the test version of the test ingredients, the version of the test ingredients stored within the local cache of the farm machine can be updated to correspond with the test version of the test ingredients. For example, an update function can be invoked which causes the file management system that maintains the software repository to update the closely related version of the test ingredients stored in the cache of the farm machine to be the same as the test version of the test ingredients stored within the software repository.

This process leaves the farm machine with a working copy of the test version of the test ingredients. That is, the closely related version of the test ingredients stored in the cache of the farm machine can be synchronized with the test version of the test ingredients stored in the software repository. As noted, the update process can modify or overwrite files, add files, delete files, as well as change the directory structure of the closely related version of the test ingredients stored in the farm machine. After step 225, the method can proceed to step 235 where testing can begin using the test version of the test ingredients now stored in the local cache of the farm machine.

In step 230, where no versions of the test ingredients stored in the local cache of the farm machine are closely related to the test version of the test ingredients, the file management system can transfer a copy of the test version of the test ingredients to the local cache of the farm machine. This process effectively creates a working copy of the test version of the test ingredients on the farm system, e.g., the version of the test ingredients having the branch attribute and revision attribute specified for use in testing. After step 230, the method can proceed to step 235, where testing can begin using the test version of the test ingredients now stored within the local cache of the farm machine.

It should be appreciated that the method 200 can be performed iteratively as may be required for each of the farm machines of a testing farm. Further, with respect to the plurality of farm machines, the method 200 can be performed serially or in parallel as may be needed according to the particular testing that is to be performed.

The embodiments disclosed herein provide an efficient technique for testing software when using a testing farm. The software repository of a file management system can be used as a caching mechanism for updating local caches disposed in each computer system of a testing farm. The local cache of each farm machine can be used to store versions of test ingredients from prior tests. In cases where a farm machine already has a version of the test ingredients that is related to the version of test ingredients needed for performing software testing, the related version of the test ingredients within the cache can be updated rather than copying the entire version of the test ingredients from the software repository to the farm machine. This can save a significant amount of time in a testing environment, particularly where many different tests involving different versions of test ingredients are to be run using a plurality of farm machines.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when loaded and executed, controls the computer system such that it carries out the methods described herein. The present invention can also be embedded in a computer program product, which comprises all the features enabling the implementation of the methods described herein, and stored in a computer system that is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e., open language. The term "coupled", as used herein, is defined as connected, although not necessarily directly, and not necessarily mechanically, e.g., communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A method of testing software, the method comprising:
maintaining a cache within at least one of a plurality of farm machines of a testing farm, wherein each cache comprises at least one version of test ingredients;
receiving, within at least one selected farm machine, a request to perform a software test using a test version of the test ingredients;
wherein the request specifies a primary attribute and a secondary attribute for the test version of the test ingredients;
wherein the test version of the test ingredients is implemented as a directory tree;
wherein the primary attribute is hierarchically related to the secondary attribute, the primary attribute is a branch attribute of a software repository, and the secondary attribute is a revision attribute of the software repository;
determining whether the test version of the test ingredients specified by the request is related to the at least one version of the test ingredients stored within the cache of the selected farm machine by comparing the primary attribute and the secondary attribute specified by the request with a primary attribute and a secondary attribute of the at least one version of the test ingredients stored within the cache of the selected farm machine;
wherein the at least one version of the test ingredients is related to the test version specified by the request when the primary attribute specified by the request matches the primary attribute of the at least one version and the secondary attribute specified by the request does not match the secondary attribute of the at least one version;
selecting a version of the test ingredients from the test ingredients stored within the cache of the selected farm machine responsive to determining that the test version of the test ingredients is related to the selected version of the test ingredients according to the comparison; and
updating the selected version of the test ingredients responsive to determining that the test version of the test ingredients is related to the selected version of the test ingredients.

2. The method of claim 1, further comprising:
copying the test version of the test ingredients from the software repository to the cache of the selected farm machine responsive to determining that no version of the test ingredients stored within the cache of the selected farm machine is closely related to the test version of the test ingredients.

3. The method of claim 1, wherein updating comprises:
when the selected version of the test ingredients stored within the cache of the selected farm machine has a branch attribute corresponding to the test version of the test ingredients and a different revision attribute, synchronizing the selected version of the test ingredients with the test version of the test ingredients, wherein the test version of the test ingredients is stored in a software repository maintained by a file management system;
when no version of the test ingredients stored within the cache of the selected farm machine has a branch attribute corresponding to the test version of the test ingredients, copying the entire test version of the test ingredients from the software repository to the cache of the selected farm machine; and when the selected version of the test ingredients stored within the cache of the selected farm machine has a branch attribute and a revision attribute corresponding to the branch attribute and revision attribute of the test version of the test ingredients stored within the software repository, using the selected version of the test ingredients stored within the cache of the selected farm machine for testing.

4. The method of claim 1, further comprising storing the test version of the test ingredients within the software repository, the software repository being managed by a file management system, wherein the software repository is accessible to each of the plurality of farm machines, and wherein the selectively updating is performed using an update procedure of the file management system.

5. A software testing system, comprising:
a file management system comprising a software repository, wherein the software repository stores a plurality of versions of test ingredients; and
a testing farm comprising a plurality of farm machines, wherein each farm machine maintains a cache configured to store at least one version of the test ingredients that has been tested on each respective farm machine,
wherein a version of the test ingredients within the caches is updated, using an update procedure of the file management system, if according to a measure of relatedness the version of the test ingredients is related to a test version of the test ingredients that each respective farm machine is instructed to use for software testing;
wherein the measure of relatedness is determined by comparing a primary attribute and a secondary attribute of the test version of the test ingredients with a primary attribute and a secondary attribute of each of the at least one version of the test ingredients stored within each respective cache, the primary attribute is a branch attribute of the software repository, and the secondary attribute is a revision attribute of the software repository;
wherein the at least one version of the test ingredients is related to the test version specified by the request when the primary attribute specified by the request matches the primary attribute of the at least one version and the secondary attribute specified by the request does not match the secondary attribute of the at least one version;
wherein the test version of the test ingredients is implemented as a directory tree; and
wherein the primary attributes and the secondary attributes are hierarchically related attributes of the file management system.

6. The system of claim 5, wherein a selected farm machine receives a request for software testing using the test version of the test ingredients and compares at least the primary attribute and the secondary attribute of the test version of the test ingredients with the primary attribute and the secondary attribute of the at least one version of the test ingredients maintained within the cache of the selected farm machine.

7. The system of claim 6, wherein the file management system selectively synchronizes a selected version of the test ingredients stored within the cache of the selected farm machine with the test version of the test ingredients responsive to determining that the primary attribute of the selected version of the test ingredients matches the primary attribute of the test version of the test ingredients and that the secondary attribute of the selected version of the test ingredients does not match the secondary attribute of the test version of the test ingredients.

8. An article of manufacture, comprising:
a machine readable storage medium having stored thereon a computer program having a plurality of code sections for testing software, the code sections comprising:
code for maintaining a cache within at least one of a plurality of farm machines of a testing farm, wherein each cache comprises at least one version of test ingredients;
code for receiving, within at least one selected farm machine, a request to perform a test involving a test version of the test ingredients;
wherein the request specifies a primary attribute and a secondary attribute for the test version of the test ingredients;
wherein the test version of the test ingredients is implemented as a directory tree;
wherein the primary attribute is hierarchically related to the secondary attribute, the primary attribute is a branch attribute of the software repository, and the secondary attribute is a revision attribute of the software repository;
code for determining whether the test version of the test ingredients specified by the request is related to the at least one version of the test ingredients stored within the cache of the selected farm machine by comparing the primary attribute and the secondary attribute specified by the request with a primary attribute and a secondary attribute of the at least one version of the test ingredients stored within the cache of the selected farm machine;
wherein the at least one version of the test ingredients is related to the test version specified by the request when the primary attribute specified by the request matches the primary attribute of the at least one version and the secondary attribute specified by the request does not match the secondary attribute of the at least one version;
code for selecting a version of the test ingredients from the test ingredients stored within the cache of the selected farm machine responsive to determining that the test version of the test ingredients is related to the selected version of the test ingredients according to the comparison; and
code for updating the selected version of the test ingredients responsive to determining that the test version of the test ingredients is related to the selected version of the test ingredients.

9. The article of manufacture of claim 8, further comprising:
code for copying the test version of the test ingredients from the software repository to the cache of the selected farm machine responsive to determining that no version of the test ingredients stored within the cache of the selected farm machine is closely related to the test version of the test ingredients.

10. The article of manufacture of claim 8, wherein the code for updating comprises:
code for, when the selected version of the test ingredients stored within the cache of the selected farm machine has a branch attribute corresponding to the test version of the test ingredients and a different revision attribute, synchronizing the selected version of the test ingredients with the test version of the test ingredients, wherein the test version is stored in a software repository maintained by a file management system;
code for, when no version of the test ingredients stored within the cache of the selected farm machine has a branch attribute corresponding to the test version of the test ingredients, copying the entire test version of the test ingredients from the software repository to the cache of the selected farm machine; and code for, when the selected version of the test ingredients stored within the cache of the selected farm machine has a branch attribute and a revision attribute corresponding to the branch attribute and revision attribute of the test version of the test ingredients stored within the software repository, using the selected version of the test ingredients stored within the cache of the selected farm machine for testing.

* * * * *